United States Patent [19]
Greenwood

[11] 4,094,225
[45] June 13, 1978

[54] TARGET DETECTING AND LOCATING SYSTEM

[76] Inventor: Eugene C. Greenwood, 250 Colton St., Newport Beach, Calif. 92660

[21] Appl. No.: 795,844

[22] Filed: Feb. 3, 1969

[51] Int. Cl.² ............................................. H04N 3/00
[52] U.S. Cl. ............................. 89/41 L; 250/203 CT; 250/342
[58] Field of Search ...................... 356/141, 152; 250/83.3 IR, 203 CT, 342; 315/10–12; 178/6.8, DIG. 21; 89/41 L, 41 B

[56] References Cited

U.S. PATENT DOCUMENTS

| | | | |
|---|---|---|---|
| 3,025,515 | 3/1962 | Fairbanks | 343/6 IR |
| 3,043,907 | 7/1962 | Martin | 250/203 CT |
| 3,165,749 | 1/1965 | Cushner | 343/6 IR |
| 3,239,605 | 3/1966 | Cholet et al. | 250/83.3 H |

Primary Examiner—Richard A. Farley
Attorney, Agent, or Firm—Philip M. Hinderstein

[57] ABSTRACT

A system for detecting and locating a source of radiation in which an image orthicon tube, sensitive only to infrared emissions at the wavelength of the source, is scanned along first and second orthogonal axes and, upon sensing incoming radiation, generates a signal which is applied to an analog computer which analyzes the signal, determines the direction from which it came, and arms a suitable responding device, such as a weapon, at the source of radiation. Provision is made for storing signals from a plurality of radiation sources so that the responding device is aimed at each in sequence.

14 Claims, 3 Drawing Figures

TARGET DETECTING AND LOCATING SYSTEM

BACKGROUND OF THE INVENTION

1. Field of the Invention

The present invention relates to a target detecting and locating system and, more particularly, to a system using an infrared detection device for detecting a source of radiation at the speed of light, plotting its location, and applying a location indicating signal to a suitable utilization device.

2. Description of the Prior Art

Many different types of systems are known which use infrared techniques for detecting sources of radiation. For example, infrared techniques have been used to detect and identify nuclear explosions so as to actuate warning or other protective devices. Infrared techniques have also been used in passive tracking and ranging systems to detect and track such things as airplanes, rockets, etc. It has also been suggested to utilize infrared techniques in a fire control system for weapons so as to detect and locate a target and to aim a weapon in the direction thereof.

Although many of these known systems are operational, they usually suffer from at least one and usually more of several problems. In the first instance and in the case where the source of radiation is of extremely brief duration, as in the case of a gunflash, existing devices are usually unable to detect or locate the source of radiation. The reasons for this are many. In many cases, since the infrared device is of the tracking type, a continuous signal is necessary to permit the servo loops to lock onto the target. However, in the case of a gunflash, the signal is gone before the tracking circuitry has an opportunity to lock onto the target.

Even where existing devices are able to detect and locate the source of radiation, an additional problem is the ability to rapidly locate, aim and fire a weapon at the source. This problem becomes critical when the infrared device is mounted on a moving aircraft since the aircraft generally moves by a substantial amount between the time that the source of radiation is detected and the time when its location is determined. As a result, where the infrared detection device is mounted on an aircraft, gyroscopes and other inertial devices, as well as complex computers, are usually required to compensate for the motion of the aircraft. Furthermore, even where the vehicle carrying the infrared detecting device is stationary, the amount of time required to respond to the source of radiation is often so great that the source has an opportunity to escape before its location is plotted.

Finally, existing devices are relatively complex, cumbersome, and costly, requiring accurate alignment and maintenance and generally making them infeasible for widespread use.

SUMMARY OF THE INVENTION

According to the present invention, there is provided a target detecting and locating system which substantially eliminates the problems mentioned above. The present detecting system eliminates the narrow-field-of-view scanning devices of the prior art and replaces them with a stationary detector having a substantially hemispherical field of view. The present detecting device instantaneously, and at the speed of light, detects any source of radiation within that field of view regardless of how brief its duration. The present system is capable of sensing a source of radiation, analyzing the source, and locating its position in a matter of a few milliseconds. The system is further capable of aiming a weapon at the source of radiation and firing a return volley in less than 200 milliseconds. Because of the speed of the present system, it can be used on a moving aircraft without requiring complex inertial devices and computers for compensating for the motion of the vehicle and can respond to the source of radiation before it has an opportunity to move. Finally, the present system is basically simple, heavy duty and maintenance free, making it suitable for use in various types of situations.

Briefly, the present target detecting and locating system comprises a standard image orthicon tube, a lens and an infrared filter for detecting a source of radiation at the speed of light. The image orthicon tube is scanned using standard raster techniques. When a source of radiation is sensed, the position of the raster beam is transferred to a simple analog or digital computer which immediately determines the direction of the source for use by suitable responding devices. According to one embodiment, the computer directs two power cylinders to aim a high speed weapon at the source. Once the weapon is aimed at the source, it is fired automatically. The computer is capable of storing signals from several radiation sources so that the weapon moves rapidly to fire bursts at each in sequence.

It is, therefore, an object of the present invention to provide a target detecting and locating system.

It is a further object of the present invention to provide an infrared system for detecting and locating a source of radiation.

It is a still further object of the present invention to provide a target detecting and locating system for generating a signal indicative of the direction of receipt of radiation from a target.

It is another object of the present invention to provide an infrared detecting and locating system which utilizes an image orthicon tube as the sensitive element.

It is still another object of the present invention to provide a target detecting and locating system which uses an infrared filter to detect only selected sources of heat.

Another object of the present invention is the provision of a system which senses a source of radiation, analyzes and locates the position of the target, and automatically aims and fires a weapon in the direction of the target.

Still other objects, features and attendant advantages of the present invention will become apparent to those skilled in the art from a reading of the following detailed description of the preferred embodiment constructed in accordance therewith taken in conjunction with the accompanying drawings wherein like numerals designate like parts in the several figures and wherein:

DESCRIPTION OF THE PREFERRED EMBODIMENT

The present target detecting and locating system may be used in a wide variety of different situations. It can be used in an air-to-air mode to track an enemy aircraft from another aircraft or rocket, the detector output being applied to an autopilot or automatic steering device, as desired. The present system may also be used in a ground-to-air mode for detecting and locating enemy aircraft or missiles and for automatically firing thereupon. The present system may also be used in a ground-to-ground mode for detecting personnel or equipment at night or for the purpose of visual identification and display. Many other non-military uses are also possible.

Figure 1:
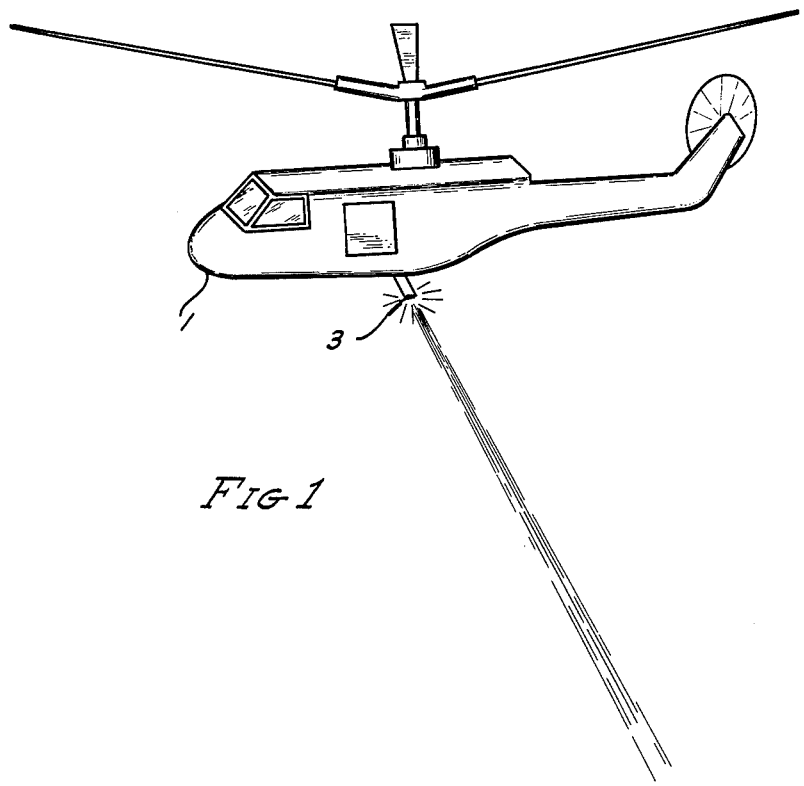
FIG. 1 is a view showing a situation in which the present target detecting and locating system may be used.

Referring now to the drawings and, more particularly, to FIG. 1 thereof, the present target detector and locating system may also be used, for example, on a helicopter or other aircraft 1 to detect and locate a source of gunfire 2. The present system is operative to generate a signal indicative of the direction of receipt of the gunfire flash. The signal so generated may then either be displayed or applied to a suitable weapon 3 to aim weapon 3 at source 2.

Figure 2:
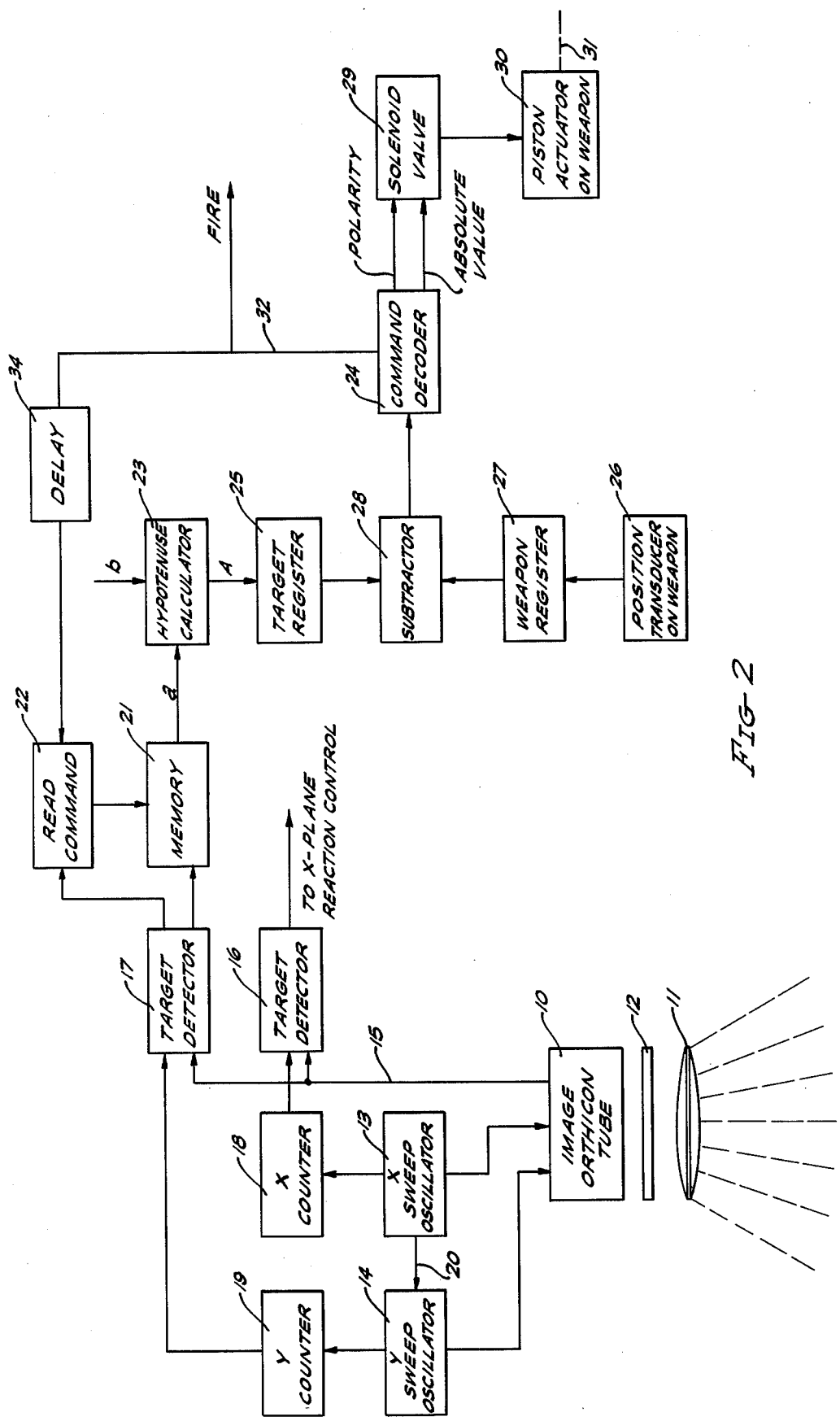
FIG. 2 is a block diagram of a preferred embodiment of the present system.

Referring now to FIG. 2, the acquisition portion of the present target detecting and locating system includes an image orthicon tube 10, a lens 11 for focusing an image of targets within any desired field of view onto orthicon tube 10, and an infrared filter 12 positioned between lens 11 and tube 10. Infrared filter 12 is operative to pass infrared wavelengths of any desired frequency, such as the frequency emitted by gunfire, and to reject wavelengths caused by other phenomena such as fire, sun reflections, etc.

Image orthicon tube 10 receives standard raster sweep signals from an X sweep oscillator 13 and a Y sweep oscillator 14. The operation of image orthicon tube 10 is entirely conventional, tube 10 generating a signal over a line 15 which is connected to identical target detectors 16 and 17. The output on line 15 is normally a low voltage potential in the absence of a suitable infrared signal reaching the sensitive element of tube 10. When such a signal occurs, a characteristic pulse is applied via line 15 to target detectors 16 and 17.

The outputs of oscillators 13 and 14 are also applied to an X counter 18 and a Y counter 19, respectively. X and Y counters 18 and 19 each operate to generate a binary number which, due to the counters being triggered from the same source as orthicon tube 10, coincides with the point in one plane at which the orthicon sweep is located. X and Y counters 18 and 19 are different, however, due to the difference between the X and Y deflection techniques used for orthicon tube 10. Along the X axis, which corresponds to the horizontal axis of a normal raster sweep, counter 18 is a free running, clock stabilized counter which re-sets at the end of each trace or cycle. Along the Y axis, which corresponds to the vertical axis of a normal raster sweep, Y sweep oscillator 14, in response to a signal over line 20 from oscillator 13, increments one unit at the end of each cycle of X sweep oscillator 13. Accordingly, Y counter 19 is an event counter which counts each horizontal trace and re-sets after each complete coverage of the raster.

The counts contained in X and Y counters 18 and 19 are continuously applied to the inputs of target detectors 16 and 17, respectively. Target detectors 16 and 17, upon receiving a pulse over line 15 from image orthicon tube 10, gate open and allow the instantaneous value of the binary numbers in counters 18 and 19 to pass to the target locating portion of the present system.

As shown in FIG. 2, there is only one image orthicon tube 10. However, the remaining components have identical counterparts, the counterpart of oscillator 13 being oscillator 14, the counterpart of counter 18 being counter 19, and the counterpart of target detector 16 being detector 17. This is due to the fact that the present system detects and locates targets in two orthogonal directions, the X and the Y directions. Therefore, for the purpose of simplicity, the remaining circuitry will be described only with respect to the Y axis since the operation of the X axis is identical.

The output of target detector 17 is applied to a memory 21 and a read command 22. Memory 21 is a standard, commercially available, memory device which is capable of storing a number of parallel binary digits with a register capacity of, for example, ten bits. Memory 21 also contains an output register capable of storing any of th other register numbers upon command. Read command 22 is simply a gating network capable of enabling the output register of memory 21 to transfer the information contained therein to a hypothenuse calculating circuit 23. With no input to read command 22, memory 21 will retain all of its stored information. Upon an input to read command 22, it enables memory 21 to transfer its longest-held information to hypothenuse calculator 23, erasing it and readying the next number for transfer to hypothenuse calculator 23.

Read command 22 receives inputs from two sources, the first source being target detector 17. In the case where only a single target is sensed by orthicon tube 10, the count contained in Y counter 19 and a target indicating signal are simultaneously applied to memory 21 and read command 22, respectively. Accordingly, read command 22 enables memory 21 to immediately transfer this information to hypothenuse calculator 23. However, in a situation where several targets are nearly simultaneously sensed by image orthicon tube 10, as many as ten binary numbers will be applied by target detector 17 from Y counter 19 to memory 21. Read command 22, in response to the first target signal, will read the coordinates of the first target out of memory 21 into hypothenuse calculator 23. The subsequent targets sensed by image orthicon tube 10 will not trigger read command 22 until the remaining circuitry has had an opportunity to respond to the first target. Accordingly, read command 22 receives a second input from a command decoder 24 via a delay 34, to be described more fully hereinafter, which signals that weapon 3 has been aimed and fired at the first target. Upon receiving such a signal from command decoder 24, read command 22 triggers memory 21 to transfer the next received target indication to hypothenuse calculator 23.

Figure 3:
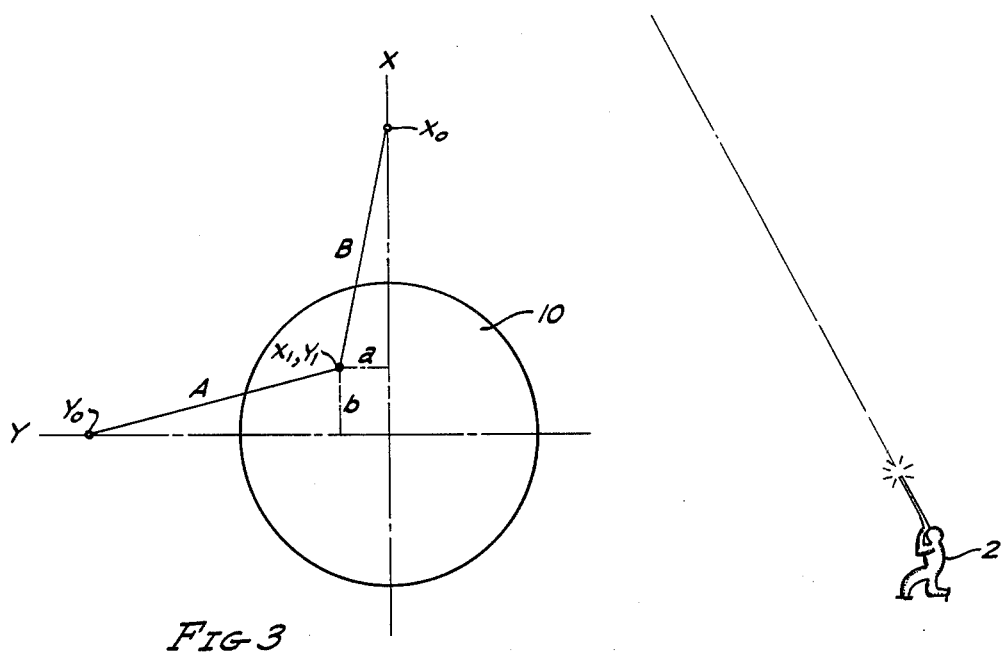
FIG. 3 is a diagram useful in explaining the operation of the system of FIG. 2.

Referring now to FIGS. 2 and 3, hypothenuse calculator 23 receives a first signal "a" from memory 21 indicating the Y coordinate of a sensed target. Hypothenuse calculator 23 also receives a signal "b" from the memory included in the X axis circuitry indicative of the X coordinate of a sensed target. According to the preferred embodiment of the present invention, the target indicating signal generated by orthicon tube 10 is utilized to move a pair of pistons (not shown) attached to weapon 3 to aim weapon 3 in the direction of target 2. Accordingly, coordinates $Y_0$ and $X_0$ in FIG. 3 represent stationary pivot points for the Y and X axis pistons, respectively, annd coordinate $Y_1$, $X_1$ represents the point of intersection of the Y and X axis pistons and weapon 3. Therefore, hypothenuse A represents the actual length that the Y axis piston should be extended to point weapon 3 at target 2. Hypothenuse calculator 23 determines the value of hypothenuse A according to the well known equation $$A^2 = b^2 + (Y_0 - a)^2.$$

A similar calculator in the X axis circuitry determines the value of B which represents the actual length that the X axis piston should be extended to point weapon 3 at target 2.

Referring now solely to FIG. 2, hypothenuse calculator 23 applies the calculated value of hypothenuse A to a target register 25. A position transducer 26 on weapon 3 detects the actual length of the X axis piston and applies an appropriate binary indication to a weapon register 27. Registers 25 and 27 may simply be flip-flop registers capable of storing the output information from hypothenuse calculator 23 and position transducer 26, respectively.

The outputs of registers 25 and 27 are applied to a subtractor 28. Subtractor 28 is simply a device which subtracts one binary number from another. The output of subtractor 28 consists of a polarity bit and an absolute value bit indicative of the difference between the numbers stored in registers 25 and 27. This difference signal from subtractor 28 is applied to command decoder 24 which is basically a digital-to-analog converter. Command decoder 24 uses the polarity bit from subtractor 28 to determine the direction of motion of the Y axis piston, as the polarity of the difference output will determine the direction weapon 3 must move to null the output, and the absolute value bit to determine the amount of motion of the Y axis piston. The outputs from command decoder 24 indicative of polarity and absolute value of the difference signal from subtractor 28 may be applied to a solenoid valve 29 which directs a piston actuator 30 to move the Y axis piston 31 to aim weapon 3 in the direction of target 2.

In operation, when weapon 3 is at rest, it is pointed at the center of the target area. When a new target is sensed, a signal is applied from image orthicon tube 10 over line 15 to target detector 17 to cause the count in counter 19 to be transferred to memory 21. Simultaneously, read command 22 causes memory 21 to transfer such signal to hypothenuse calculator 23. Hypothenuse calculator 23 calculates the value of hypothenuse A and applies a binary indication thereof to target register 25. Weapon register 27, at this time, contains a count of 0. Therefore, subtractor 28 senses a difference and an appropriate signal is applied to command decoder 24 which applies suitable signals to solenoid valve 29 located on the weapon control actuators. The signal from command decoder 24 is either forward or back in the Y plane and is capable of moving piston 31 in either of two directions or stopping. When valve 29 receives its signal from command decoder 24 to open in the required direction, it snaps open and high pressure hydraulic fluid is directed into a cylinder, moving piston 31 and weapon 3. As piston 31 moves, it moves a linear transducer 26 with it which returns a position indicating signal via weapon register 27 to subtractor 28. When the signal from position transducer 26 nears the position called for in target register 25, the voltage output of command decoder 24 begins to drop, causing solenoid valve 29 to start closing. As piston 31 and weapon 3 reach a position where the signals from registers 25 and 27 exactly match, valve 29 closes, locking piston 31 and weapon 3 in position. Simultaneously, and upon sensing a zero difference signal from subtractor 28, command decoder 24 generates a signal over a line 32 to automatically fire weapon 3. Firing continues for a preselected period of time, usually dictated by the characteristics of weapon 3. The firing signal is also applied to read command 22 via delay network 34 to signal it that the weapon has been fired and is now ready to be moved to the next target. Delay 34 is provided to enable weapon 3 to fire for the preselected period of time before being moved to the next target. At the end of the firing period, weapon 3 is either directed to a new firing position immediately or, after all target signals have been read out of memory 21, is returned to center and rested.

The above sequence is taking place simultaneously in two sets of cylinders, each one causing a piston to move to the position which was signalled from the memory for its plane. In addition, a firing signal must be received from the command decoders in both channels before firing takes place.

The hydraulic lines associated with solenoid valve 29 and piston actuator 30 should be large and selected for quick action and high flow. Under such circumstances, opening of valve 29 may taken place in approximately 4 milliseconds and movement to the required location may take from 15 to 190 milliseconds, depending on the distance from center and the inertia of weapon 3. Firing begins simultaneously with reaching location, resulting in a total elapsed time of under 200 milliseconds from the sensing of target 2 to the return of fire. By way of example, if a shot is fired from the ground at a helicopter carrying the present target detecting and locating system and assuming that the gun on the ground has a muzzle velocity of 2000 feet per second, the present system senses the muzzle flash, analyzes, aims, and fires a return volley in less than 200 milliseconds. Assuming a high speed machine gun on helicopter 1 with a muzzle velocity of 3000 feet per second, the bullets from helicopter 1 may reach the rifleman before his bullet reaches the helicopter. Furthermore, due to the rapidity of the return of fire and the tremendous rate of fire of modern machine guns, no compensation is required for movement of helicopter 1 and a high kill rate can be expected even the presence of a substantial speed of helicopter 1. For example, a rifle fired by an enemy on the ground at a helicopter flying overhead at 200 miles per hour could have its fire returned in the time it takes the helicopter to traverse a mere 5 feet.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments but only by the scope of the appended claims.

I claim:

1. A system for detecting and locating a source of radiation comprising:
   detector means sensitive to incoming radiation for generating a signal indicative of the receipt thereof;
   filter means positioned between said source and said detector means for passing radiation of only a selected frequency;
   means for scanning said detector means along first and second orthogonal axes;

digital counting means responsive to said scanning means for generating first and second binary signals indicative of the instantaneous scan direction of said detector means along said first and second orthogonal axes, respectively; and utilization means responsive to the occurrence of a radiation indicating signal and said first and second binary signals for indicating the instantaneous direction to a received source of radiation.

2. A system for detecting and locating a source of radiation comprising:

detector means sensitive to incoming radiation for generating a signal indicative of the receipt thereof;

filter means positioned between said source and said detector means for passing radiation of only a selected frequency;

means for scanning said detector means along first and second orthogonal axes;

means responsive to said scanning means for generating first and second signals indicative of the instantaneous scan direction of said detector means along said first and second orthogonal axes, respectively; and utilization means responsive to the occurrence of a radiation indicating signal and said first and second direction indicating signals for indicating the instantaneous direction to a received source of radiation, said utilization means comprising:

memory means for storing said first and second direction indicating signals; and gating means responsive to the occurrence of a radiation indicating signal for transferring said first and second direction indicating signals to said memory means whereby said memory means stores the location of a received source of radiation.

3. A system according to claim 2 wherein said detector means comprises:
an image orthicon tube.

4. A system according to claim 3 further comprising:
lens means for focusing an image of said radiation source onto said image orthicon tube.

5. A system according to claim 3 wherein said scanning means comprises:
first and second oscillators for generating a raster sweep pattern, the outputs of said oscillators being applied to said orthicon tube.

6. A system according to claim 2 wherein said utilization means is operative to indicate the direction to a received source of radiation upon the occurrence of a single radiation indicating signal.

7. A system according to claim 2 wherein said memory means is operative to store a plurality of sets of said first and second direction indicating signals.

8. A system according to claim 2 further comprising:
means for responding to said source of radiation; and wherein said utilization means comprises:
means for automatically pointing said responding means in the direction of said source of radiation.

9. A system according to claim 8 wherein said responding means is moveable in two orthogonal directions under the control of a pair of variable members connected between first and second stationary points and said responding means, and wherein said utilization means comprises:

means coupled to said memory means and responsive to said first and second direction indicating signals for determining the required length of said variable members to point said responding means in the direction of said source and for generating third and fourth signals indicative thereof;

means for generating fifth and sixth signals indicative of the instantaneous actual length of said variable members; and means responsive to said third through sixth signals for determining the difference between the actual and required lengths of said members and for generating an error signal as a function thereof, said responding means adapted to be moved to reduce said error signal to zero.

10. A system according to claim 9 wherein said utilization means further comprises:

means responsive to said error signal becoming zero for generating a signal to automatically actuate said responding means.

11. A system according to claim 10 wherein said memory means is operative to store a plurality of sets of said first and second direction indicating signals and wherein said actuating signal is applied to said gating means and wherein said gating means is further operative to transfer one of said sets of said first and second direction indicating signals to said determining means upon the occurrence of a radiation indicating signal and to prevent transfer of a subsequent set of first and second direction indicating signals to said determining means until after said responding means is actuated.

12. A system according to claim 2 wherein said detector means is a stationary image orthicon tube having a substantially hemispherical field of view.

13. A system for detecting and locating a source of radiation comprising:

detector means sensitive to incoming radiation for generating a signal indicative of the receipt thereof;

filter means positioned between said source and said detector means for passing radiation of only a selected frequency;

means for scanning said detector means along first and second orthogonal axes;

means responsive to said scanning means for generating first and second signal indicative of the instantaneous scan direction of said detector means along said first and second orthogonal axes, respectively; and utilization means responsive to the occurrence of a radiation indicating signal and said first and second direction indicating signals for indicating the instantaneous direction to a received source of radiation, wherein said system is operative to aim a weapon in the direction of said source of radiation, said weapon being movable in two orthogonal directions under the control of a pair of variable members connected between first and second stationary points and said weapon, and wherein said utilization means comprises:

means responsive to said first and second signals for determining the required length of said variable members to aim said weapon in the direction of said source and for generating third and fourth signals indicative thereof;

means for generating fifth and sixth signals indicative of the instantaneous actual length of said variable members; and means responsive to said third through sixth signals for determining the difference between the actual and required lengths of said members and for generating an error signal as a function thereof, said weapon adapted to be moved to reduce said error signal to zero.

14. A system according to claim 13 wherein said utilization means further comprises:

means responsive to said error signal becoming zero for generating a signal to automatically fire said weapon at said radiation source.

* * * * *